May 4, 1965     H. E. HENNIS     3,182,088
METHOD OF MAKING A TETRABROMOBISPHENOL
Filed May 26, 1961
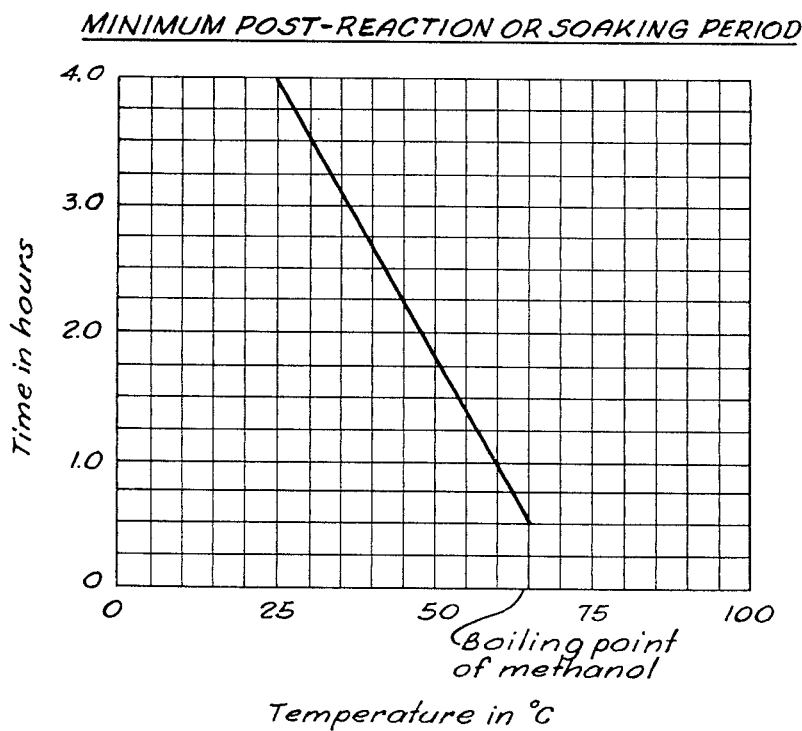
INVENTOR.
Henry E. Hennis
ATTORNEY

United States Patent Office 3,182,088
Patented May 4, 1965

3,182,088
METHOD OF MAKING A TETRABROMO-BISPHENOL
Henry E. Hennis, Midland, Mich., assignor to The Dow Chemical Company, Midland, Mich., a corporation of Delaware
Filed May 26, 1961, Ser. No. 112,770
9 Claims. (Cl. 260—619)

The invention pertains to an improved method of making tetrabromobisphenols and by-product methyl bromide. The term "bisphenols," as used herein, means the binuclear phenolic compounds among which are 4,4'-dihydroxybenzophenone; 4,4'-methylenediphenol; 4,4'-ethylidenediphenol; 4,4'-isopropylidenediphenol; 4,4'-isobutylidenediphenol; 4,4'-sec-butylidenediphenol; and 4,4'-dihydroxydiphenyl.

Bisphenols are widely used in the chemical art and especially in admixture with epichlorohydrin under suitable reaction conditions in the manufacture of epoxy resins. Recently it has been discovered that halogenated bisphenols, and most especially tetrabromobisphenols, produce epoxy resins that are resistant to burning. Methyl bromide is a valuable commodity having a large number of known uses, e.g., as a chemical intermediate, as a fumigant, and the like.

A number of attempts have been made to make tetraboromobisphenol in satisfactorily high yields in a sufficiently pure state for general use as an intermediate, e.g., in the manufacture of epoxy resins. Such attempts have included admixing bromine directly with bisphenol in a suitable reaction vessel, admixing bromine with a bisphenol dissolved in an organic solvent, e.g., a lower alkanol, and such organic solvents admixed with water. None of these attempts has been fully satisfactory unless accompanied by a special reaction condition, e.g., that described in my co-pending application, Serial No. 112,768, filed concurrently herewith. A need exists for a more efficient method of making a purer grade tetrabromobisphenol and in economically high yields.

The principal object of the invention, accordingly, is to provide a more convenient and more efficient method of making tetrabromobisphenol in high yield and of good quality and color. A further object of the invention is to provide such method by which methyl bromide may be prepared as a by-product.

It has been found that the foregoing and related objects may be attained by reacting bromine and a bisphenol in substantially pure methanol as the reaction medium to form a tetrabromobisphenol in the methanol and thereafter adding water to the reaction mixture to cause that tetrabromobisphenol, which remains dissolved in the methanol, to separate and be readily recoverable therefrom, as by filtration or other separatory technique.

The invention is carried out by admixing a bisphenol with methanol and adding bromine slowly thereto, over a period of at least 0.5 hour and preferably over a period of at least 1 hour, in an amount sufficient to provide at least about 4 moles of bromine ($Br_2$) per mole of the bisphenol, at a temperature between about 15° and 35° C., and preferably between about 20° and 25° C., followed by a post reaction period of between about room temperature (18° or 20° C.) and the boiling point of methanol (about 65° C.), for at least about 0.5 hour when at the boiling point of methanol and for at least about 4.0 hours when at room temperature, and thereafter admixing water therewith over a period of at least about 0.5 hour and preferably over a period of at least about 1.5 hours. Moderate, more-or-less continuous, stirring is provided throughout the addition and heating steps. A high purity tetrabromobisphenol is thus made in high yield which is recovered by known means, e.g., filtration. The amount of methanol employed is not highly critical so long as the amount present is ample to serve as a reaction medium, e.g., between 1.0 and 2.0 parts thereof by weight per part of bisphenol. The amount of water employed is that which provides a ratio, by weight, of methanol to water of between about 1 and about 2. The amount of bromine employed is at least 4 and usually less than about 4.5 moles thereof per mole of bisphenol to insure complete bromination without an uneconomical excess of bromine. The bisphenol employed is usually 4,4'-isopropylidenediphenol, commonly referred to as bisphenol A. The length of time required for the post reaction period is inversely related to the time, i.e., the higher the temperature, the shorter the post reaction time required. The graph in the attached drawing will serve as a guide for ascertaining the temperature and minimum time combination required for a high yield of a good quality product. Only the values plotted at 0.5 hour at 65° C. and at 4.0 hours at 25° C. were obtained experimentally. The intervening values represent temperatures at half hour intervals based upon the temperature-time relationship indicated by the ascertained 0.5 hour and 4.0 hour runs.

Reference to the graph shows that decreasing lengths of post reaction periods may be employed with increasing temperatures. However, certain advantages and disadvantages accompany decreasing the time and increasing the temperature of post reaction period. Among the advantages of the higher temperature mode of operation is the reduced time requirement and the higher volume output permitted. Another advantage of the higher temperature mode of practicing the invention is the higher production of methyl bromide as a valuable by-product. When carrying out the invention at the boiling point of the methanol in a vessel provided with a reflux condenser and recovering the methyl bromide being produced, e.g., in a Dry Ice-acetone bath, at least about 61 percent of the methyl bromide theoretically possible, based upon the HBr formed during bromination, may be thus recovered. The principal disadvantage of the higher temperature operation is a somewhat less pure tetrabromobisphenol product. It is, therefore, recommended that where a tetrabromobisphenol of premium quality is desired, that the post reaction period be carried out for at least about 3.0 and preferably at least about 4 hours at between 20° and about 45° C. However, where methyl bromide is a desired by-product and a tetrabromobisphenol of less than premium quality is acceptable, the post reaction period may advantageously be carried out at above 45° C. and preferably at the boiling point of methanol and under reflux conditions.

The reaction mixture is usually cooled while the water is being added thereto but, if desired, cooling may precede or follow the water addition.

By the practice of the invention, yields of tetrabromobisphenol of over 96%, based on the weight of the bisphenol employed, are usually obtained. The product so obtained has a melting point of between 177° and 179° C., indicating a purity of 99.2% pure tetrabromobisphenol by weight.

The following examples are illustrative of the practice of the invention.

EXAMPLE 1

Into a reaction vessel, equipped with a reflux condenser, an air-driven stirrer, a thermometer, and a dropping funnel, were put 483 grams of methanol and 344 grams (1.51 moles) of bisphenol A. The vessel was then purged with nitrogen gas. Thereafter 968 grams (6.05 moles) of bromine were added thereto dropwise over a period of 1.6 hours, accompanied by stirring.

The temperature throughout the bromine addition was between 20° and 23° C. The reacttion mixture was maintained at that temperature accompanied by stirring for 5 hours following the bromine addition. Thereafter, 228 grams of water were added dropwise, accompanied by stirring, over a 1 hour period. Stirring was then continued for an additional hour following the water addition during which a precipitate continued to form.

The precipitated product so formed was recovered from the reaction medium by collecting the reaction product on a Buchner funnel and washing it thereon with 9 separate additions of water. The thus washed product was dried in an oven at 60° C. The product so obtained weighed 784 grams, representing a 96.2% yield of the theoretical amount based on the bisphenol A employed. It was a white product having a melting point of 177–179° C. and a freezing point of 177° C. The product was shown to consist of 99.2% pure tetrabromobisphenol A or 4,4'-isopropylidenebis(2,6-dibromophenol).

EXAMPLE 2

The procedure of Example 1 was repeated except that the methanol solution of bisphenol, after bromination, was heated at the reflux temperature thereof and maintained at reflux conditions for 0.5 hour instead of at substantially room temperature. During the post reaction period, both $CH_3Br$ and some HBr were volatilized off through a line leading from the vent in the top of the reflux condenser into a 1 N aqueous solution of NaOH. The HBr was thereby neutralized. A line then continued from the NaOH solution to a trap consisting of a vessel packed in a Dry Ice-acetone mixture where the $CH_3Br$ was liquefied.

The precipitate formed in the reaction vessel was recovered on a Buchner funnel, water-washed, and dried. 801 grams were thereby recovered which was a 97.0% yield, based on the bisphenol present. The freezing point thereof was determined to be 173°. Analysis showed it to be 97.2% by weight 4,4'-isopropylidenebis(2,6-dibromobisphenol). The $CH_3Br$ recovered in the trap was weighed and found to consist of 348 grams of substantially pure $CH_3Br$. This represented a recovery of 61% of the $CH_3Br$ theoretically possible based on the HBr produced during the bromination of the bisphenol A. Thus it is shown that soaking at reflux temperature (65° C.) for 0.5 hour resulted in conversion of 61% of the available HBr to $CH_3Br$.

The following runs were made for purpose of comparison.

Run A

The procedure followed in Example 1 (wherein the post reaction period was between 20° and 23° C.) was followed except that a mixture of 2 parts methanol and 1 part water by weight was employed as the reaction medium during bromination and the post reaction period. No water was subsequently added. The precipitate formed was recovered, washed and dried. The freezing point thereof was determined and found to be 169.5° C., indicating a lower purity 4,4'-isopropylidenebis(2,6-dibromophenol) than that produced according to the invention. The percent yield was 93.6% of that possible which is significantly lower than that obtained in Example 1.

Run B

The procedure of Example 2 (wherein the post reaction period was at refluxing conditions) was repeated except that the reaction medium during bromination and post reaction period consisted of a mixture of 2 parts by weight of methanol and 1 part water (as in Run A above). No water was subsequently added. The precipitate formed was recovered, washed, dried and evaluated. It had a freezing point of 167.0° C. which indicated that the 4,4'-isopropylidene(2,6-dibromophenol) produced was of low purity. The percent yield, based on the bisphenol present, was 94.9 percent. The $CH_3Br$ recovered during the refluxing period was only 36 percent of that possible, based on the HBr formed during bromination. It is clear that the percent yield and purity of the tetrabromobisphenol are greatly impaired and the recovery of valuable $CH_3Br$ is much reduced when the methanol-water mixture was employed in contrast to the practice of the invention as illustrated by Example 2.

Run C

The procedure of Example 2 was again repeated except that substantially pure ethanol was employed as the reaction medium during bromination rather than methanol. The water was added at the close of the post reaction or heating period as in Example 2. However, when the water was so added, to precipitate out dissolved tetrabromobisphenol, a very tacky product formed which could not be washed or purified.

Reference to the examples of the invention and to the runs made for comparative purposes shows that a satisfactory quality product can be obtained in good yield in an efficiently short time only:

When methanol alone is employed as the reaction medium during bromination, a post reaction period, equivalent to at least 0.5 hour at reflux temperature or at least 4 hours at room temperature is employed, and water then admixed therewith to precipitate the remaining dissolved tetrabromobisphenol.

When methanol-water mixtures or ethanol alone is employed as the reaction medium the process is unsatisfactory.

Having described my invention what I claim and desire to be protected by Letters Patent is:

1. The method of making alkylidenebis(dibromophenol) of high purity and in good yield and by-product methyl bromide consisting essentially of dissolving an alkylidenediphenol in substantially pure methanol, adding bromine thereto in sufficient amount to provide the stoichiometric quantity thereof at a temperature of between about 20° and 25° C. over a pediod of at least about 1 hour, accompanied by moderate stirring, and, while continuing to stir, soaking the reaction mixture at a minimum temperature of between at least about 18° C. for at least about 4 hours and about 65° C. for at least about 0.5 hour, the time of the soaking period being inverse to the temperature, condensing methyl bromide evolving therefrom, during the soaking period, and thereafter, while continuing to stir, adding water thereto over a period of at least about 0.5 hour to precipitate substantially all the tetrabromobisphenol formed and recovering the tetrabromobisphenol from the water-methanol mixture.

2. The method according to claim 1 wherein the bisphenol is 4,4'-isopropylidenediphenol.

3. The method according to claim 1 wherein the bromine is employed in a molar ratio of between 4 and about 4.5 moles per mole of the bisphenol.

4. The method according to claim 1 wherein the weight ratio of methanol to bisphenol is between about 1 and 2.

5. The method according to claim 1 wherein the weight ratio of methanol to the water subsequently added is between about 1 and 2.

6. The method of making an alkylidenebis(dibromophenol) of clear color and high purity in good yield and by-product methyl bromide by dissolving an alkylidenediphenol in substantially pure methanol and admixing at least the stoichiometric quantity of bromine required to form the alkylidenebis(dibromophenol), over a period of at least about 0.5 hour at a temperature between about 15° and about 35° C., and thereafter providing a soaking period at a temperature between about 25° C. and about 65° C. between about 4.0 hours and 0.5 hour in accordance with the time-temperature curve shown on the annexed drawing, said soaking period being accompanied by agitation, condensing methyl bromide being evolved therefrom, and thereafter adding water to the reaction mixture, over a period of at least 1 hour accompanied by agitation, to precipitate the alkylidenebis(dibromophenol) remaining dissolved in the reaction mixture, and recovering the alkylidenedibromophenol so made.

7. The method according to claim 6 wherein the temperature during the soaking period is carried out above about 45° C.

8. The method according to claim 7 wherein the soaking period temperature is the boiling point of the methanol reaction medium and vapors of the methanol reaction medium are refluxed for at least about 0.5 hour.

9. The method according to claim 8 wherein a mixture of vaporous $CH_3Br$ and HBr are vented during the refluxing period, the mixture passed into an aqueous alkali metal hydroxide solution to neutralize the HBr present, and the $CH_3Br$ is passed into a cold trap to liquefy the $CH_3Br$ present.

References Cited by the Examiner
UNITED STATES PATENTS 3,029,291  4/62  Dietzler _____ 260—619

LEON ZITVER, *Primary Examiner.*

CHARLES B. PARKER, *Examiner.*